Patented Sept. 29, 1942

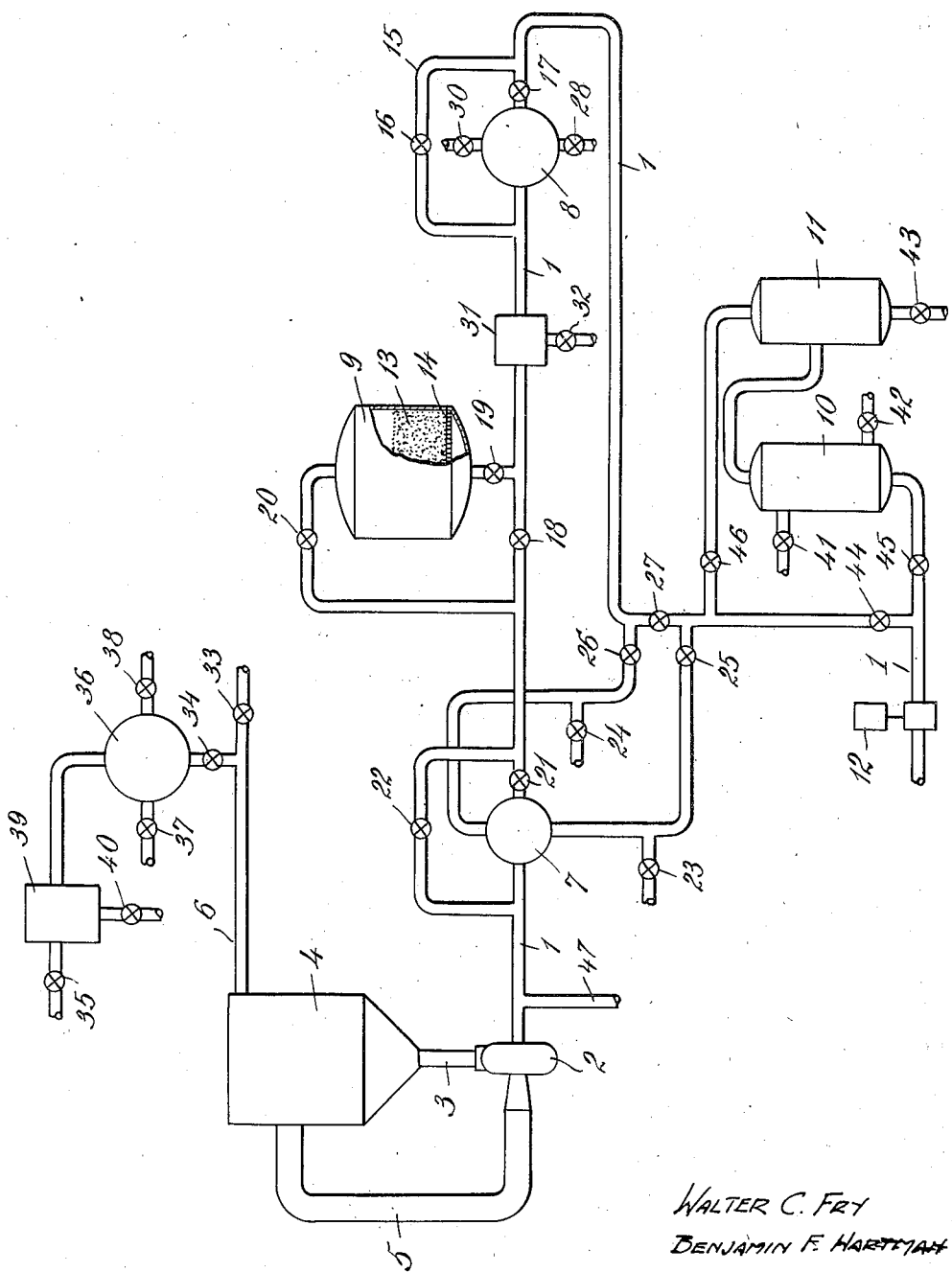

2,297,650

UNITED STATES PATENT OFFICE 2,297,650

METHOD OF TREATING OILS

Walter C. Fry and Benjamin F. Hartman, Augusta, Kans., assignors to Socony-Vacuum Oil Company, Incorporated, New York, N. Y., a corporation of New York Application October 19, 1939, Serial No. 300,153

2 Claims. (Cl. 196—29)

This invention relates to a process for the treatment of hydrocarbon mineral oil fractions to render them sweet to the "doctor" test. Hydrocarbon mineral oils of the nature of gasolines, cracked gasolines, naphthas, solvents, kerosene and similar products, as produced, usually contain sulphur compounds of the nature of mercaptans and related organic sulphur compounds of a "sour" nature. These oils are in general "sweetened" by some process which so changes the nature of these compounds as to render them unreactive in the "doctor" test. A useful method for accomplishing such sweetening is that of contacting the oils with some form of a salt of a metal capable of forming a mercaptide, under oxidizing conditions, whereby the mercaptans and/or related compounds, reactive to the "doctor" test are converted to organic disulphides unreactive to the "doctor" test. One convenient form of such treatment is set forth in Reissue Patent 20,938 to Charles O. Hoover, wherein the oil is contacted with a reagent consisting of an absorbent material, for example a clay such as fuller's earth, which has been impregnated or admixed with a salt of a mercaptide-forming metal, for example cupric chloride. The contacting occurs in the presence of oxygen, whereby the copper-containing reagent is continuously regenerated, and accomplishes the desired sweetening by an "oxidation" of doctor-reactive mercaptans and similar compounds to non-doctor-reactive or "sweet" forms of sulphur compounds.

As set forth in the said Hoover Reissue Patent 20,938, there are two methods for accomplishing such treatment. The first is that method commonly known in the art as the "slurry" method, set forth in the patent as Figure 1, wherein a stream of oil to be treated is admixed with the reagent to accomplish treating, the oil and admixed reagent then flowing together into a settling zone wherein the reagent settles from the oil, the oil being drawn off. The reagent, together with some oil, is recirculated to contact with newly incoming oil. As pointed out in the Hoover patent, this method may be successfully operated until there has accumulated in company with the dry reagent about 10 to 30 per cent or more of water, at which time the reagent becomes inoperative and must be withdrawn from the process and dried by some additional manipulation.

No method is taught or suggested whereby the operation of the slurry form of the process may be made fully continuous or whereby the difficulties arising from accumulation of water in association with the solid reagent may be avoided. Since the "slurry" method is that form which is best adapted to commercial practice, in that less reagent is used; in that it is better adapted to the continuous processing of large quantities of oil; in that it may be practiced in existing equipment in many cases, even when newly installed requires less capital outlay, utilizes a reagent more readily provided, and has numerous other advantages, it is much to be preferred if it could be made fully continuous.

This invention has for its object the provision of a method or methods of operation whereby the operation of the slurry process may be made fully continuous, fully adapted to the treatment of stocks of any degree of "sour" sulphur content, and whereby the difficulties heretofore encountered in connection with the deleterious effect of water accumulated during operation in association with the solid treating reagent may be entirely avoided.

As pointed out in the Hoover patent, many solid absorbent materials, such as fuller's earth, bentonite, or like clays, may be used, and many metal compounds, such as cupric oxide, cupric hydroxide, cupric chloride, mercuric chloride, ferric chloride, ferric sulphide, etc., may be used. The process herein provided is likewise adaptable to all such reagents consisting of a solid adsorbent impregnated or admixed with a compound of a metal capable of reaction with mercaptans and capable of revivification or regeneration under the conditions of use. While mixtures of fuller's earth and cupric chloride are most commonly used, and will be used herein for purposes of example and explanation, the invention is not to be considered as limited thereto or thereby.

A convenient and exemplary reagent for use in the slurry process consists of 10 parts of fuller's earth of about 200 mesh fineness, with which has been admixed about 1½ parts by weight of $CuCl_2 2(H_2O)$. This reagent, because of the residual moisture in the clay and because of the water of crystallization of the cupric salt, contains 5–10 per cent of its weight of water. A similar reagent, utilizing granular fuller's earth, may be used in the "bed-in-place" method.

The reaction of sweetening, involving change of mercaptans to disulphides in the presence of oxygen and a salt of a metal capable of differing degrees of oxidation, results in the production of water in direct proportion to the mercaptan reacted upon. For example, summing the total reaction $2RSH + 2CuCl_2 + \tfrac{1}{2}O_2 \rightarrow$
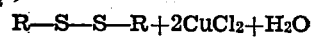
$R\text{—}S\text{—}S\text{—}R + 2CuCl_2 + H_2O$ It is the water so produced which accumulates upon the solid reagent mixture. As shown in the Hoover patent, when the water so accumulated has raised the total amount of water present and associated with the reagent to about 10 to 30 per cent by weight of the reagent, the slurry method becomes inoperative, probably due to a change in the physical nature of the reagent arising from and caused by the water present. With certain oils, such as, for example, cracked gasolines high in "sour" sulphur compounds, the rate of accumulation of water from this cause is so great as to reduce the possibility of continuous operation of the process below economic limits.

Consequently, as set forth in the Hoover patent, the limit of operation of this process is determined by the fact that the amount of water should not reach such an extent as to form an independent solution phase separable or flowable as such from the adsorbent material, or as to form an aqueous muddy mass with the clay or other adsorbent.

This invention is based upon the discovery that we may prevent the accumulation of water in association with the reagent in deleterious amounts and that thereby the operation may be made fully continuous, even for use with oils containing large amounts of "sour" sulphur, and that the operator need never resort to the expedient of removing the reagent at intervals for outside drying, as described in the Hoover patent and found necessary by the art. The savings to be obtained through this continuous operation of the process are quite evident to those versed in the art.

In order to explain the method which may be used, reference is now made to the drawing attached to this specification, showing in diagram form a setup of apparatus suitable for practicing the processes herein disclosed.

In the diagrammatic setup shown in the single figure of the drawing, oil to be treated—for example, cracked gasoline—passes through pipe 1 into eductor-mixer 2, and due to its jetting action therein is admixed with the solid—adsorbent-metal salt reagent withdrawn through pipe 3 from settler 4. Air or oxygen is added through pipe 47. Passing through mixing zone 2, wherein sweetening is effected, the stream of oil and reagent passes through 5 and is discharged into settler 4. In settler 4 the reagent settles from the oil and, dropping to the cone bottom of settler 4, is returned through pipe 3 to the eductor-mixer 2. Treated gasoline, settled free of reagent, is withdrawn from settler 4 by pipe 6. Installed in by-passes connected with pipe 1 and available for treatment of the gasoline passing therethrough, are heat exchangers 7 and 8, dry bed case 9, washer 10 and settler 11. Heat exchangers 7 and 8 may be used to control the temperature of the flowing gasoline in a manner and for a purpose hereinafter explained. Drying bed case 9 is charged with an effective drying material, substantially nonreactive with the gasoline, such as rock salt (NaCl) or calcium chloride or other appropriate drying agent capable of removing dissolved water from oil. Washer 10, when used is charged with an aqueous solution of caustic soda, or similar sulphur removing reagent and settler 11 is provided to ensure complete separation from the oil of any aqueous phase carried over from 10. The gasoline is passed through the system under pressure imposed by pump 12.

The first and most convenient of the methods by which accumulation of water in deleterious amounts in association with the solid reagent may be prevented is by control of the amount of water dissolved in the incoming gasoline. This may be accomplished by so operating drying bed case 9 as to remove from the incoming gasoline a substantial amount of the water dissolved therein. To this end case 9 may be charged with a drying bed formed, for example, by placing rock salt (NaCl) or calcium chloride or activated alumina in a bed as indicated at 13 upon a support plate 14. Such drying beds are well known in the art. It has been taught that any water which may be dissolved in the oil does not impair the process. In contrast thereto, the present applicants have made the surprising discovery that if the incoming oil be rendered free to a substantial extent of dissolved water, that the water produced by the reaction is immediately dissolved in the oil being treated, and is never permitted to accumulate in deleterious amounts in association with the solid reagent, and that thereby the loss of activity of the reagent in the "slurry" process as described in the Hoover patent, may be avoided entirely and the process becomes fully continuous.

In order to achieve this effect, the oil charged to the process must be freed of dissolved water by controlled treatment in drying bed 9, or otherwise, to such an extent that substantially all of the water formed by reaction may be dissolved readily as formed. The extent of reduction may be calculated from the amount of mercaptan sulphur present, remembering that one mol of water is formed for each two atomic units of mercaptan hydrogen present. Since analytical methods for mercaptans and dissolved water are available, this data may be readily applied, or in the absence of such analyses, the proper operation may be determined by trial.

Since from consideration of the reaction heretofore explained, about 64 weight units of mercaptan sulphur give rise to about 18 weight units of water of reaction, it will suffice, for ready calculation, to so reduce the water content that the difference between weight percent of water needed for saturation of the gasoline at treating temperature, and weight percent of water actually present is about $18/64$ of the weight percent of mercaptan sulphur present in the raw oil to be treated.

A further degree of control over the complete removal of water reaction from the system may be had by use of the heat exchangers 7 and 8, either operated alone or in conjunction with the drying bed. The heat exchangers are utilized to so adjust the temperature of the oil in connection with the amount of water dissolved therein, that water of reaction may be picked up as formed. For example, in one type of operation wherein heat exchanger 8 is not used, the incoming oil, at any given temperature, is passed through bypass 15, valve 16 being open and valve 17 being closed, and thence through drying bed case 9, valves 18 being closed and valves 19 and 20 being opened, and thence through heat exchanger 7, valve 21 being open and valve 22 being closed. In heat exchanger 7 the oil will be heated to some temperature above that obtaining in drying bed case 9, but below a temperature at which mercaptans will decompose, and due to this increase in temperature, the capacity of the oil for dissolving and removing water of reaction in the treating zone 5 will be much increased. In this operation an appropriate heating medium will be passed through heat exchanger 7 through valves 23 and 24, valves 25 and 26 being closed.

Since in most refineries, oils to be treated are collected prior to treatment and stored for at least a short period of time in storage tanks in which the oil reaches a rather stable temperature near the prevailing atmospheric temperature, the temperature of treatment in drying bed case 9 in the procedure outlined above would be most conveniently that temperature of storage, which may for present purposes be defined as atmospheric temperature.

In view of the fact that stored oil for treatment represents a large heat reservoir relative to the amount undergoing treatment, a more convenient way of operation would be as follows: Heat exchanger 8 would be utilized to cool the oil well below the atmospheric temperature, utilizing a cooling medium flowing through valved pipes 30 and 28 and in heat exchanger 7, after passing through 9 the temperature of the oil would be raised to approximately atmospheric by heat interchange with incoming oil, provided through open valves 25 and 26, valves 23, 24 and 27 being closed. The decrease of solubility of water in gasoline may be availed of to assist in removal of dissolved water. In case sufficient cooling is available, we may even dispense with the use of drying bed case 9, close valves 19 and 20, open valve 18, passing the oil and precipitated water through separator 31 wherein the water may be collected and removed through pipe 32, the oil passing on to exchanger 7, and a sufficient removal of water be obtained thereby.

The degree of temperature change to be effected hereby is relatively inconsiderable. As will be shown at length, below, a change of ten to twenty degrees in the range between 60° and 100° F. will suffice in many cases, depending on mercaptan content to render the "slurry" process continuously operable. In practically all normal cases 50° F. is sufficient.

To show the necessary operating ranges for typical cases we may set forth operation by the "slurry" method upon a typical gasoline of 60° A. P. I. gravity, containing a total of 0.02 per cent by weight of "sour" mercaptan sulphur. A moment's calculation will show that this gasoline, upon treatment, will give rise to .015# of water of reaction per barrel of gasoline treated. In commercial operation it has been found that in a slurry system containing 100# of the solid reagent above described, 50 barrels of oil per hour can be effectively treated. Assuming that the solid reagent as charged contains 5% water by weight, and that it becomes inoperative at 15% water by weight, (minimum and maximum limits respectively as set forth above) then the accumulation of ten (10) pounds of water of reaction will render the process inoperative. That is, only 666 barrels of oil may be treated, and only 13.3 hours will elapse between necessary shutdowns for change of reagent.

The conditions necessary to make the operation fully continuous would be as follows:

(1) By removal of dissolved water only. Assuming that the gasoline from storage, as fed to the process is at 90° F., and saturated with water, as it necessarily would be, having been in contact with steam and water throughout its previous history, it would contain about .030 pound of water per barrel. To remove the water of reaction as formed, the gasoline would need to have 50% of its dissolved water removed.

(2) By temperature alone. Assuming that the gasoline from storage be precooled by heat exchanger 7 and fully cooled in heat exchanger 8, then returned to the 90° storage temperature by passage through the other side of heat exchanger 7, no drying bed being used, the temperature of oil leaving heat exchanger 8 would be that corresponding to a water content of .015 pound per barrel at saturation. This temperature would be about 60° F.

(3) Combination temperature change and removal of dissolved water. Reduction of dissolved water in gasoline to the extent of 50% at the exemplary temperature of 90° F. is entirely possible and practicable, but far more economical operation of drying beds is obtained with smaller reductions, say of the order of 20%. Similarly, 60° F. cooling medium is not expensive, but a warmer cooling medium is less expensive and frequently more readily available. Again assuming the same gasoline, at 90° F., cooled in heat exchanger 8, separated water dropped out in 31, the water content then reduced to 80% of saturation in 9, and the gasoline reheated in heat exchanger 7 to 90° F., the temperature to which it must be cooled in heat exchanger 8 is only about 70° F.

Further, if the gasoline feed is even only partially stabilized as it comes from the distilling operation and it can be handled without undue vaporation losses at 95° F., as most gasolines may be, the degree of cooling necessary in heat exchanger 8, coupled with a 20% reduction of dissolved water content, would require a temperature of about 82° F.

Thus it may be seen that the processes herein disclosed provide means whereby the operation as known to the art may be made fully continuous by taking advantage of minor variations purposely provided in the temperature and dissolved water content of the oil fed to the process.

These serve admirably in the case of gasolines of normal content of "sour" sulphur. But with oils containing high "sour" sulphur content additional process means must be provided. Considering a gasoline containing .06% by weight of "sour" mercaptan sulphur it is apparent that the reagent charge previously noted, in the absence of water control as herein shown, will treat only 222 barrels of gasoline, and that reagent must be changed every 4.4 hours. To handle the problem by removal of dissolved water alone would not be possible, since even 100% dry gasoline at 90° F. would take up only two thirds of the water of reaction. To handle the problem by 50% reduction of dissolved water, using a gasoline temperature, prior to the dry case, of 40° F. would require a treating temperature of something like 140°–150° F. which would require vapor recovery because of the loss of light ends of the gasoline under a system of treating conducted at the usual normal pressures.

Two ways of dealing with this problem of oils high in content of "sour" sulphur exist. The first to be described is that of operating the treating system under pressure. Referring again to the drawing, free exit of treated oil from the system would be stopped by closing valve 33, and with valve 34 open, back pressure would be held upon the system by partial closure of valve 35. The treated oil could then be raised to a temperature sufficient to ensure removal of reaction water by heat exchanger 7. Under such operation it would be appropriate to return the treated oil to atmospheric temperature by passage through heat exchanger 36, provided with cooling medium through pipes 37 and 38, after which the water dropped out by cooling could be separated in settler 39 and removed by pipe 40.

The second way, which, for various reasons, is to be preferred, is that of reduction of the "sour" sulphur content by pre-treatment with some reagent such as an aqueous solution of caustic soda. This reduction can be so conducted, with respect to other preparatory controls such partial removal of dissolved water and temperature variation, as to bring about the continuous operation of the "slurry" process by proper adjustment of the amount of sulphur to be removed therein. For this purpose there may be used any of those reagents, such as solid caustic soda or caustic potash, aqueous solutions of caustic soda, caustic potash, sodium carbonate, and similar reagents capable of removing mercaptans to a substantial degree. Of these reagents, that to be preferred is an aqueous solution of caustic soda. This reagent is readily capable, without exacting control or non-economical use of additive reagents or assistants, of effecting a sufficient reduction in "sour" sulphur to permit continuous operation of the "slurry" sweetening reaction. For example, with the gasoline having a "sour" sulphur content of .060% by weight, a reduction of only 50% in this sulphur, to .030% by weight, will permit continuous processing, at a treating temperature of 95° F. if the gasoline be cooled to about 60° F.

In order that this pretreatment may be applied, returning again to the drawing, there are provided treating drum 10, to which reagent may be added and withdrawn by pipes 41 and 42, and separator 11 wherein any aqueous phase carried over from 10 may be separated and withdrawn through pipe 43. These pieces of equipment are installed in a by-pass section of pipe 1 and may be utilized by closing valve 44, valves 45 and 46 being opened.

While the use of a pretreatment by aqueous caustic soda for the removal of hydrogen sulphide has been suggested in connection with the solid reagent method of treatment, the operation here disclosed is something more than that. This operation not only goes beyond the usual pre-caustic wash adopted by removing hydrogen sulphide, but requires a competent control of degree of removal of "sour" sulphur other than that contained in hydrogen sulphide, which controlled degree of removal must be so adjusted with respect to following steps of partial or complete removal of dissolved water and control of dissolved water content by controlled variation of the temperature of treatment and of oil prior to treatment as to constitute a new process step not heretofore present in the art.

From the foregoing it may be seen that the present invention comprises essentially the steps of controlling the dissolved water content of the gasoline to be treated with respect to the water of reaction produced, and of controlling the water of reaction to be produced with respect to the dissolved water carrying ability of the gasoline to be treated so as to minimize or to prevent entirely the accumulation of deleterious water in association with the solid reagent utilized in the process described.

Further, it is to be noted that in these reactions there is a necessary minimum amount of water which must be present to keep the reaction going. This feature is pointed out in the Hoover reissue patent and is confirmed by experience. Consequently it becomes apparent that to ensure complete control over the reaction and over the continuity of the process that the control of the capability of the feed oil to remove water of reaction, in conjunction with control of the amount of water of reaction to be formed must be exercised within certain quite definite limits, since an excess of water removal capability will stop the reaction by rendering the reagent inactive, and an excess of water of reaction will likewise stop the process by rendering the reagent inactive. It is understood that the terms "activity" and "inactive" used variously with respect to the reagent refer to its ability or lack of ability to sweeten under given operative conditions, and that "inactivity" may arise from difficulties of contacting due to blanketing or similar purely physical effects of excess water quite as well as from any chemical effects.

We claim:

1. The process of treating sour hydrocarbon oil to remove sourness which comprises contacting a flowing stream of said oil, in the presence of gaseous oxygen added thereto with a substantially dry mixture comprising an adsorbent material and a salt of copper which forms mercaptides with mercaptans, separating said dry mixture from the oil and returning it to the contacting step, all without accumulation of water in the said dry mixture during a prolonged period of continuous operation of indefinite length in which the dissolved water content of the raw oil to be treated is partially reduced in a dehydrating zone by a controlled amount prior to treatment, and the oil is then heated so that a temperature differential of not more than about 50° F. is maintained between the dehydrating step and the treating step, the partial reduction of dissolved water and the temperature differential being so inter-related that the amount of water which may be dissolved by the oil while being treated is substantially equal to the water which is produced by reaction of the mercaptan sulphur present in the raw oil.

2. The process of treating sour hydrocarbon oil to remove sourness which comprises contacting a flowing stream of said oil, in the presence of gaseous oxygen added thereto with a substantially dry mixture comprising an adsorbent material and a salt of copper which forms mercaptides with mercaptans, separating said dry mixture from the oil and returning it to the contacting step, all without accumulation of water in the said dry mixture during a prolonged period of continuous operation of indefinite length in which the dissolved water content of the raw oil is partially reduced by exposure to a dehydrating agent prior to sweetening, and the oil is then heated to maintain a temperature differential of 10° to 50° F. between the dehydrating and sweetening steps, the degree of removal of dissolved water and the temperature of treating being so related that the amount of additional water which may be dissolved by the oil at the treating temperature, expressed in weight per cent of oil, is of the order of $18/64$ of the weight per cent of mercaptan sulphur present in the raw oil to be treated.

WALTER C. FRY.
BENJAMIN F. HARTMAN.